(12) United States Patent
Miller et al.

(10) Patent No.: US 9,115,556 B2
(45) Date of Patent: Aug. 25, 2015

(54) METHOD OF USING BIOLOGICALLY-DERIVED MONOESTERS AS DRILLING FLUIDS

(71) Applicant: Chevron U.S.A. Inc., San Ramon, CA (US)

(72) Inventors: Stephen Joseph Miller, San Francisco, CA (US); Saleh Ali Elomari, Fairfield, CA (US); Edward Malachosky, Spring, TX (US); Edward Keith Morton, Katy, TX (US); Ronald John Lenz, Jr., Richmond, TX (US); Rithana Chea, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/973,754

(22) Filed: Aug. 22, 2013

(65) Prior Publication Data

US 2014/0138159 A1    May 22, 2014

Related U.S. Application Data

(63) Continuation-in-part of application No. 13/682,542, filed on Nov. 20, 2012.

(51) Int. Cl.
*C09K 8/035* (2006.01)
*C10L 1/14* (2006.01)
*E21B 21/00* (2006.01)
*C09K 8/04* (2006.01)

(52) U.S. Cl.
CPC .. *E21B 21/00* (2013.01); *C09K 8/04* (2013.01)

(58) Field of Classification Search
CPC .............................. C09K 8/18; C09K 2208/34
USPC ............................. 507/103; 508/459; 560/265
See application file for complete search history.

(56) References Cited

U.S. PATENT DOCUMENTS

| | | | |
|---|---|---|---|
| 2,510,300 A | 6/1950 | Walls | |
| 2,797,196 A | 6/1957 | Dunn et al. | |

(Continued)

FOREIGN PATENT DOCUMENTS

| | | |
|---|---|---|
| EP | 0374671 | 6/1990 |
| EP | 0374672 | 6/1990 |

(Continued)

OTHER PUBLICATIONS

Pliolite Technical Data Sheet (Oct. 2013).*

(Continued)

*Primary Examiner* — Pamela H Weiss
(74) *Attorney, Agent, or Firm* — Melissa M. Hayworth; Steven H. Roth; Mary R. Bram (57) ABSTRACT

The present invention is directed to the method drilling a borehole with monoester-based drilling fluid compositions. In some embodiments, the methods for making such monoester-based lubricants utilize a biomass precursor and/or low value Fischer-Tropsch (FT) olefins and/or alcohols so as to produce high value monoester-based drilling fluids. In some embodiments, such monoester-based drilling fluids are derived from FT olefins and fatty acids. The fatty acids can be from a bio-based source (i.e., biomass, renewable source) or can be derived from FT alcohols via oxidation.

18 Claims, 2 Drawing Sheets

Internal (secondary) monoesters

(56) References Cited

U.S. PATENT DOCUMENTS

| | | |
|---|---|---|
| 5,232,910 A | 8/1993 | Mueller |
| 5,252,554 A | 10/1993 | Mueller |
| 5,318,954 A | 6/1994 | Mueller et al. |
| 5,403,822 A | 4/1995 | Mueller et al. |
| 5,441,927 A | 8/1995 | Mueller et al. |
| 6,017,854 A * | 1/2000 | Van Slyke .................... 507/118 |
| 6,100,223 A * | 8/2000 | Gee .............................. 507/267 |
| 6,191,076 B1 * | 2/2001 | Gee .............................. 507/267 |
| 6,849,581 B1 | 2/2005 | Thompson et al. |
| 7,666,820 B2 | 2/2010 | Mueller et al. |
| 8,148,305 B2 | 4/2012 | Westfechtel et al. |
| 8,153,562 B2 | 4/2012 | Muller et al. |
| 8,236,735 B2 | 8/2012 | Maker et al. |
| 2003/0114316 A1* | 6/2003 | Patel et al. .................... 507/138 |
| 2005/0239662 A1 | 10/2005 | Patel |
| 2006/0073981 A1 | 4/2006 | Gee |
| 2006/0254826 A1* | 11/2006 | Alberthy ....................... 175/72 |
| 2007/0219097 A1* | 9/2007 | Mueller et al. ................ 507/110 |
| 2011/0009300 A1 | 1/2011 | Elomari et al. |
| 2012/0053099 A1 | 3/2012 | Zhou et al. |
| 2012/0329682 A1 | 12/2012 | Fefer |

FOREIGN PATENT DOCUMENTS

| | | |
|---|---|---|
| WO | WO 9530818 A1 * | 11/1995 |
| WO | 99/36387 | 7/1999 |
| WO | 9933932 | 7/1999 |
| WO | 2007137709 | 12/2007 |
| WO | 2008046554 | 4/2008 |
| WO | 2009/053455 | 4/2009 |
| WO | 2009142922 | 11/2009 |

OTHER PUBLICATIONS

International Search Report and Written Opinion from corresponding application PCT/US2014/052043 mailed Nov. 13, 2014.

* cited by examiner

METHOD OF USING BIOLOGICALLY-DERIVED MONOESTERS AS DRILLING FLUIDS

CROSS REFERENCE TO RELATED APPLICATIONS

This application is a Continuation-in-Part application of co-pending U.S. patent application Ser. No. 13/682,542, filed Nov. 20, 2012.

FIELD OF THE INVENTION

This invention relates to monoester-based drilling fluid compositions, their methods of preparation and methods for use in a subterranean formation in oil and gas recovery operations, wherein they are made from at least one biologically-derived precursor and/or Fischer-Tropsch product(s).

BACKGROUND OF THE INVENTION

Drilling fluids employing synthetic fluids (i.e., monoester-based drilling fluids) as the base fluid are capable of achieving 96 hour $LC_{50}$ Mysid shrimp (*Mysidopsis bahia*) bioassay test results greater than 100,000 ppm. However, even with these bioassay test results their commercial use has been severely restricted.

Accordingly, there is a need for a drilling fluid which employs an inexpensive, non-toxic synthetic fluid as the base fluid. The present invention satisfies this need by providing a drilling fluid comprising: (a) at least one drilling fluid additive (e.g., an emulsifier, a viscosifier, a weighting agent, and an oil-wetting agent) and (b) an inexpensive, non-toxic base fluid composed of monoester(s).

Previously, it has been reported that secondary esters can be used with invert drilling muds, wherein the esters comprised of $C_1$-$C_5$ carboxylic acids and one or more $C_3$-$C_{22}$ olefins (see U.S. Pat. Nos. 6,100,223 and 6,191,076). Furthermore, the related U.S. patent application Ser. No. 13/682,542 (Monoester-Based Lubricants and Methods of Making Same), filed Nov. 20, 2012, and incorporated in its entirety herein, provides a simpler, more efficient method of preparing monoesters.

As such, it would be extremely useful and desirable to employ methods of drilling a borehole in a subterranean formation with a biodegradable and non-toxic monoester-based drilling fluid, particularly when such methods utilize renewable raw materials in combination with converting low value Fischer-Tropsch (FT) olefins and alcohols to high value monoester-based drilling fluids.

In this aspect, it has been found that the monoesters prepared from $C_6$-$C_{41}$ carboxylic acids and $C_8$-$C_{84}$ olefins of the subject invention provide excellent properties for use in drilling fluids. In particular, the monoesters of this invention have a lower viscosity and excellent gel strength at high temperature and pressure than the current commercially available esters on the market today.

SUMMARY OF THE INVENTION

In one embodiment, the present invention is directed to a method for drilling a borehole in a subterranean formation comprising the steps of: a) rotating a drill bit at the bottom of the borehole; and b) introducing a drilling fluid into the borehole to pick up drill cuttings and to carry at least a portion of the drill cuttings out of the borehole, wherein the drilling fluid comprises: i) at least one additive selected from the group consisting of emulsifiers, wetting agents, viscosifiers, weighting agents, and fluid loss control agents; and ii) a quantity of at least one monoester of Formula I:

wherein $R_1$ and $R_2$ and are independently selected from $C_1$ to $C_8$ and $R_3$ is $C_5$ to $C_{13}$.

BRIEF DESCRIPTION OF THE DRAWINGS

FIG. 2(*a*) illustrates a generic monoester, FIG. 2(*b*) illustrates octyl hexanoate monoesters and FIG. 2(*c*) illustrates decyl hexanoate monoesters.

DETAILED DESCRIPTION OF THE INVENTION

In some embodiments, the present invention is directed to a method for drilling a borehole in a subterranean formation comprising the steps of: a) rotating a drill bit at the bottom of the borehole; and b) introducing a drilling fluid into the borehole to pick up drill cuttings and to carry at least a portion of the drill cuttings out of the borehole, wherein the drilling fluid comprises: i) at least one additive selected from the group consisting of emulsifiers, wetting agents, viscosifiers, weighting agents, and fluid loss control agents; and ii) a quantity of at least one monoester of Formula I, wherein said steps are performed continually.

In some embodiments, the present invention is directed to a method for drilling a borehole in a subterranean formation, wherein the monoester of Formula I is biodegradable and non-toxic.

In some embodiments, the present invention is directed to a method for drilling a borehole in a subterranean formation, wherein the monoester of Formula I is derived from an isomerized olefin.

In some embodiments, the present invention is directed to a method for drilling a borehole in a subterranean formation, wherein $R_1$ and $R_2$ are independently selected from $C_1$ to $C_8$ and $R_3$ is $C_5$ to $C_{12}$.

In some embodiments, the present invention is directed to a method for drilling a borehole in a subterranean formation, wherein $R_1$ and $R_2$ are independently selected from $C_1$ to $C_5$ and $R_3$ is $C_5$ to $C_8$.

In some embodiments, the present invention is directed to a method for drilling a borehole in a subterranean formation, wherein $R_1$ and $R_2$ are independently selected from $C_1$ to $C_3$ and $R_3$ is $C_5$ to $C_6$.

In some embodiments, the present invention is directed to a method for drilling a borehole in a subterranean formation, wherein the kinematic viscosity of the monoester of Formula I at a temperature of 100° C. is between about 0.5 cSt to 2 cSt, a temperature of 40° C. is between about 2 cSt to 4 cSt and a temperature of 0° C. is between about 4 cSt to 12 cSt.

In some embodiments, the present invention is directed to a method for drilling a borehole in a subterranean formation, wherein the monoester of Formula I has an Oxidator BN of greater than 30 hours.

In some embodiments, the present invention is directed to a method for drilling a borehole in a subterranean formation, wherein the monoester of Formula I has an Oxidator BN of greater than 50 hours.

In some embodiments, the present invention is directed to a method for drilling a borehole in a subterranean formation, wherein the monoester of Formula I has an Oxidator BN of greater than 60 hours.

In some embodiments, the present invention is directed to a method for drilling a borehole in a subterranean formation, wherein the monoester of Formula I has a pour point less than about −20° C.

In some embodiments, the present invention is directed to a method for drilling a borehole in a subterranean formation, wherein the monoester of Formula I has a pour point less than about −60° C.

In some embodiments, the present invention is directed to a method for drilling a borehole in a subterranean formation, wherein the drilling fluid has a pour point less than about 10° C. and a viscosity at 40° C. between about 1 cSt to about 10 cSt.

In some embodiments, the present invention is directed to a method for drilling a borehole in a subterranean formation, wherein the drilling fluid has a 10 second gel strength between about 2 lb/100 sq ft to about 15 lb/100 sq ft.

In some embodiments, the present invention is directed to a method for drilling a borehole in a subterranean formation, wherein the drilling fluid has a 10 second gel strength of about 2 lb/100 sq ft at about 93.3° C. and about 1000 psig.

In some embodiments, the present invention is directed to a method for drilling a borehole in a subterranean formation, wherein the drilling fluid has a 10 second gel strength of about 1 lb/100 sq ft at about 121.1° C. and about 15000 psig.

In some embodiments, the present invention is directed to a method for drilling a borehole in a subterranean formation, wherein the drilling fluid produced a rheological property profile in the Fann 77 illustrated in Table 2A.

In some embodiments, the present invention is directed to a method for drilling a borehole in a subterranean formation, wherein the drilling fluid produced a rheological property profile in the Fann 77 illustrated in Table 2B.

In some embodiments, the present invention is directed to a method for drilling a borehole in a subterranean formation, wherein the drilling fluid has a 10 minute gel strength between about 1 lb/100 sq ft to about 17 lb/100 sq ft.

In some embodiments, the present invention is directed to a method for drilling a borehole in a subterranean formation, wherein $R_3$ is $C_5$.

In some embodiments, the present invention is directed to a method for drilling a borehole in a subterranean formation, wherein $R_3$ is $C_5$ and $R_1$ and $R_2$ are $C_2$.

In some embodiments, the present invention is directed to a method for drilling a borehole in a subterranean formation, wherein $R_3$ is $C_5$ and $R_1$ and $R_2$ are $C_3$.

In some embodiments, the present invention is directed to a method for drilling a borehole in a subterranean formation, wherein the at least one monoester of Formula I is an octyl hexanoate, its isomers, and mixtures thereof.

In some embodiments, the present invention is directed to a method for drilling a borehole in a subterranean formation, wherein the at least one monoester of Formula I is decyl hexanoate, its isomers, and mixtures thereof.

In some embodiments, the present invention is directed to a method for drilling a borehole in a subterranean formation, wherein the at least one monoester of Formula I is a mixture of an octyl hexanoate, its isomers, and a decyl hexanoate, its isomers, and mixtures thereof.

In some embodiments, the present invention is directed to a method for drilling a borehole in a subterranean formation, wherein the drilling fluid of Step (b) comprises between about 20 wt % to 40 wt % of the monoester of Formula I.

In some embodiments, the present invention is directed to a method for drilling a borehole in a subterranean formation, wherein the drilling fluid of Step (b) further comprises:
   a. between about 1.0 wt % to about 3.0 wt % of the emulsifier and wetting agent;
   b. between about 0.1 wt % to about 1.5 wt % of an organophilic clay;
   c. between about 5 wt % to about 12 wt % of water;
   d. between about 1.0 wt % to about 4.0 wt % of a salt;
   e. between about 0.1 wt % to about 1.0 wt % of the latex filtration control agent;
   f. between about 40 wt % to about 60 wt % of the weighting agent; and
   g. between about 3.0 wt % to about 9.0 wt % of the simulated drill solids.

In some embodiments, the present invention is directed to a method for drilling a borehole in a subterranean formation, wherein the drilling fluid comprises a monoester selected from the group consisting of hexanyl hexanoate and isomers, hexanyl octanoate and isomers, hexanyl decanoate and isomers, hexanyl laureate and isomers, hexanyl palmitate and isomers, hexanyl hexadecanoate and isomers, hexanyl stearate and isomers, octanyl hexanoate and isomers, octanyl octanoate and isomers, octanyl decanoate and isomers, octanyl laureate and isomers, octanyl palmitate and isomers, octanyl hexadecanoate and isomers, octanyl stearate and isomers, decanyl hexanoate and isomers, decanyl octanoate and isomers, decanyl decanoate and isomers, decanyl laureate and isomers, decanyl palmitate and isomers, decanyl hexadecanoate and isomers, decanyl stearate and isomers, dodecanyl hexanoate and isomers, dodecanyl octanoate and isomers, dodecanyl decanoate and isomers, dodecanyl laureate and isomers, dodecanyl palmitate and isomers, dodecanyl hexadecanoate and isomers, dodecanyl stearate and isomers, tetradecanyl hexanoate and isomers, tetradecanyl octanoate and isomers, tetradecanyl decanoate and isomers, tetradecanyl laureate and isomers, tetradecanyl palmitate and isomers, tetradecanyl hexadecanoate and isomers, tetradecanyl stearate and isomers, hexadecanyl hexanoate and isomers, hexadecanyl octanoate and isomers, hexadecanyl decanoate and isomers, hexadecanyl laureate and isomers, hexadecanyl palmitate and isomers, hexadecanyl hexadecanoate and isomers, hexadecanyl stearate and isomers, octadecanyl hexanoate and isomers, octadecanyl octanoate and isomers, octadecanyl decanoate and isomers, octadecanyl laureate and isomers, octadecanyl palmitate and isomers, octadecanyl hexadecanoate and isomers, octadecanyl stearate and isomers, icosanyl hexanoate and isomers, icosanyl octanoate and isomers, icosanyl decanoate and isomers, icosanyl laureate and isomers, icosanyl palmitate and isomers, icosanyl hexadecanoate and isomers, icosanyl stearate and isomers, docosanyl hexanoate and isomers, docosanyl octanoate and isomers, docosanyl decanoate and isomers, docosanyl laureate and isomers, docosanyl palmitate and isomers, docosanyl hexadecanoate and isomers and docosanyl stearate and isomers, and mixtures thereof.

In some embodiments, the present invention is directed to a method for drilling a borehole in a subterranean formation, wherein the drilling fluid further comprises the components: (a) lime, (b) fluid loss control agent, (c) an aqueous solution comprising water and the shale inhibiting salt, (d) oil wetting agent, (e) non-sulfonated polymer, (f) sulfonated polymer and (g) non-organophilic clay.

In some embodiments, the present invention is directed to a method for drilling a borehole in a subterranean formation, wherein the at least one monoester of Formula I has a molecular mass that is from at least about 144 a.m.u, to at most about 592 a.m.u.

In some embodiments, the present invention is directed to a method for drilling a borehole in a subterranean formation, wherein the monoester of Formula I is derived from an internal olefin.

In some embodiments, the present invention is directed to a method for drilling a borehole in a subterranean formation, wherein the monoester of Formula I is derived from a secondary alcohol.

In some embodiments, the present invention is directed to a method for drilling a borehole in a subterranean formation, wherein the monoester of Formula I is secondary monoester.

In some embodiments, the present invention is directed to a method for drilling a borehole in a subterranean formation, wherein the —O(CO)$R_3$ group of Formula I is not bound to the terminus of $R_1$ or $R_2$.

In some embodiments, the present invention is directed to a method for drilling a borehole in a subterranean formation, wherein the monoester of Formula I does not comprise products derived from oligomerization.

In some embodiments, the present invention is directed to a method for drilling a borehole in a subterranean formation, wherein the monoester of Formula I does not comprise products derived from alpha olefins.

In one embodiment, the present invention is directed to a drilling fluid composition comprising a quantity of at least one monoester of Formula I:

I wherein $R_1$ and $R_2$ and are independently selected from $C_1$ to $C_8$ and $R_3$ is $C_5$ to $C_{13}$.

In some embodiments, the present invention is directed to a drilling fluid composition comprising a quantity of at least one monoester of Formula I, wherein the monoester of Formula I is biodegradable and non-toxic.

In some embodiments, the present invention is directed to a drilling fluid composition comprising a quantity of at least one monoester of Formula I, wherein the monoester of Formula I is derived from an isomerized olefin.

In some embodiments, the present invention is directed to a drilling fluid composition comprising a quantity of at least one monoester of Formula I, wherein $R_1$ and $R_2$ and are independently selected from $C_1$ to $C_8$ and $R_3$ is $C_5$ to $C_{12}$.

In some embodiments, the present invention is directed to a drilling fluid composition comprising a quantity of at least one monoester of Formula I, wherein $R_1$ and $R_2$ are independently selected from $C_1$ to $C_5$ and $R_3$ is $C_5$ to $C_8$.

In some embodiments, the present invention is directed to a drilling fluid composition comprising a quantity of at least one monoester of Formula I, wherein $R_1$ and $R_2$ are independently selected from $C_1$ to $C_3$ and $R_3$ is $C_5$ to $C_6$.

In some embodiments, the present invention is directed to a drilling fluid composition comprising a quantity of at least one monoester of Formula I, wherein the kinematic viscosity of the monoester of Formula I at a temperature of 100° C. is between about 0.5 cSt to 2 cSt, a temperature of 40° C. is between about 2 cSt to 4 cSt and a temperature of 0° C. is between about 4 cSt to 12 cSt.

In some embodiments, the present invention is directed to a drilling fluid composition comprising a quantity of at least one monoester of Formula I, wherein the monoester of Formula I has an Oxidator BN of greater than 30 hours.

In some embodiments, the present invention is directed to a drilling fluid composition comprising a quantity of at least one monoester of Formula I, wherein the monoester of Formula I has an Oxidator BN of greater than 50 hours.

In some embodiments, the present invention is directed to a drilling fluid composition comprising a quantity of at least one monoester of Formula I, wherein the monoester of Formula I has an Oxidator BN of greater than 60 hours.

In some embodiments, the present invention is directed to a drilling fluid composition comprising a quantity of at least one monoester of Formula I, wherein the monoester of Formula I has a pour point less than about −20° C.

In some embodiments, the present invention is directed to a drilling fluid composition comprising a quantity of at least one monoester of Formula I, wherein the monoester of Formula I has a pour point less than about −60° C.

In some embodiments, the present invention is directed to a drilling fluid composition comprising a quantity of at least one monoester of Formula I, wherein the drilling fluid has a pour point less than about 10° C. and a viscosity at 40° C. between about 1 cSt to about 10 cSt.

In some embodiments, the present invention is directed to a drilling fluid composition comprising a quantity of at least one monoester of Formula I, wherein the drilling fluid has a 10 second gel strength between about 2 lb/100 sq ft to about 15 lb/100 sq ft.

In some embodiments, the present invention is directed to a drilling fluid composition comprising a quantity of at least one monoester of Formula I, wherein the drilling fluid has a 10 second gel strength of about 2 lb/100 sq ft at about 93.3° C. and about 1000 psig.

In some embodiments, the present invention is directed to a drilling fluid composition comprising a quantity of at least one monoester of Formula I, wherein the drilling fluid has a 10 second gel strength of about 1 lb/100 sq ft at about 121.1° C. and about 15000 psig.

In some embodiments, the present invention is directed to a drilling fluid composition comprising a quantity of at least one monoester of Formula I, wherein the drilling fluid produced a rheological property profile in the Fann 77 illustrated in Table 2A.

In some embodiments, the present invention is directed to a drilling fluid composition comprising a quantity of at least one monoester of Formula I, wherein the drilling fluid produced a rheological property profile in the Fann 77 illustrated in Table 2B.

In some embodiments, the present invention is directed to a drilling fluid composition comprising a quantity of at least one monoester of Formula I, wherein the drilling fluid has a 10 minute gel strength between about 1 lb/100 sq ft to about 17 lb/100 sq ft.

In some embodiments, the present invention is directed to a drilling fluid composition comprising a quantity of at least one monoester of Formula I, wherein $R_3$ is $C_5$.

In some embodiments, the present invention is directed to a drilling fluid composition comprising a quantity of at least one monoester of Formula I, wherein $R_3$ is $C_5$ and $R_1$ and $R_2$ are $C_2$.

In some embodiments, the present invention is directed to a drilling fluid composition comprising a quantity of at least one monoester of Formula I, wherein $R_3$ is $C_5$ and $R_1$ and $R_2$ are $C_3$.

In some embodiments, the present invention is directed to a drilling fluid composition comprising a quantity of at least one monoester of Formula I, wherein the at least one monoester of Formula I is an octyl hexanoate, its isomers, and mixtures thereof.

In some embodiments, the present invention is directed to a drilling fluid composition comprising a quantity of at least one monoester of Formula I, wherein the at least one monoester of Formula I is decyl hexanoate, its isomers, and mixtures thereof.

In some embodiments, the present invention is directed to a drilling fluid composition comprising a quantity of at least one monoester of Formula I, wherein the at least one monoester of Formula I is a mixture of an octyl hexanoate, its isomers, and a decyl hexanoate, its isomers, and mixtures thereof.

In some embodiments, the present invention is directed to a drilling fluid composition comprising a quantity of at least one monoester of Formula I, wherein the drilling fluid of Step (b) comprises between about 20 wt % to 40 wt % of the monoester of Formula I.

In some embodiments, the present invention is directed to a drilling fluid composition comprising a quantity of at least one monoester of Formula I, wherein the drilling fluid further comprises:
   a. between about 1.0 wt % to about 3.0 wt % of the emulsifier and wetting agent;
   b. between about 0.1 wt % to about 1.5 wt % of an organophilic clay;
   c. between about 5 wt % to about 12 wt % of water;
   d. between about 1.0 wt % to about 4.0 wt % of a salt;
   e. between about 0.1 wt % to about 1.0 wt % of the latex filtration control agent;
   f. between about 40 wt % to about 60 wt % of the weighting agent; and
   g. between about 3.0 wt % to about 9.0 wt % of the simulated drill solids.

In some embodiments, the present invention is directed to a drilling fluid composition comprising a quantity of at least one monoester of Formula I, wherein the drilling fluid comprises a monoester selected from the group consisting of hexanyl hexanoate and isomers, hexanyl octanoate and isomers, hexanyl decanoate and isomers, hexanyl laureate and isomers, hexanyl palmitate and isomers, hexanyl hexadecanoate and isomers, hexanyl stearate and isomers, octanyl hexanoate and isomers, octanyl octanoate and isomers, octanyl decanoate and isomers, octanyl laureate and isomers, octanyl palmitate and isomers, octanyl hexadecanoate and isomers, octanyl stearate and isomers, decanyl hexanoate and isomers, decanyl octanoate and isomers, decanyl decanoate and isomers, decanyl laureate and isomers, decanyl palmitate and isomers, decanyl hexadecanoate and isomers, decanyl stearate and isomers, dodecanyl hexanoate and isomers, dodecanyl octanoate and isomers, dodecanyl decanoate and isomers, dodecanyl laureate and isomers, dodecanyl palmitate and isomers, dodecanyl hexadecanoate and isomers, dodecanyl stearate and isomers, tetradecanyl hexanoate and isomers, tetradecanyl octanoate and isomers, tetradecanyl decanoate and isomers, tetradecanyl laureate and isomers, tetradecanyl palmitate and isomers, tetradecanyl hexadecanoate and isomers, tetradecanyl stearate and isomers, hexadecanyl hexanoate and isomers, hexadecanyl octanoate and isomers, hexadecanyl decanoate and isomers, hexadecanyl laureate and isomers, hexadecanyl palmitate and isomers, hexadecanyl hexadecanoate and isomers, hexadecanyl stearate and isomers, octadecanyl hexanoate and isomers, octadecanyl octanoate and isomers, octadecanyl decanoate and isomers, octadecanyl laureate and isomers, octadecanyl palmitate and isomers, octadecanyl hexadecanoate and isomers, octadecanyl stearate and isomers, icosanyl hexanoate and isomers, icosanyl octanoate and isomers, icosanyl decanoate and isomers, icosanyl laureate and isomers, icosanyl palmitate and isomers, icosanyl hexadecanoate and isomers, icosanyl stearate and isomers, docosanyl hexanoate and isomers, docosanyl octanoate and isomers, docosanyl decanoate and isomers, docosanyl laureate and isomers, docosanyl palmitate and isomers, docosanyl hexadecanoate and isomers and docosanyl stearate and isomers, and mixtures thereof.

In some embodiments, the present invention is directed to a drilling fluid composition comprising a quantity of at least one monoester of Formula I, wherein the drilling fluid further comprises the components: (a) lime, (b) fluid loss control agent, (c) an aqueous solution comprising water and the shale inhibiting salt, (d) oil wetting agent, (e) non-sulfonated polymer, (f) sulfonated polymer and (g) non-organophilic clay.

In some embodiments, the present invention is directed to a drilling fluid composition comprising a quantity of at least one monoester of Formula I, wherein the at least one monoester of Formula I has a molecular mass that is from at least about 144 a.m.u, to at most about 592 a.m.u.

In some embodiments, the present invention is directed to a drilling fluid composition comprising a quantity of at least one monoester of Formula I, wherein the monoester of Formula I is derived from an internal olefin.

In some embodiments, the present invention is directed to a drilling fluid composition comprising a quantity of at least one monoester of Formula I, wherein the monoester of Formula I is derived from a secondary alcohol.

In some embodiments, the present invention is directed to a drilling fluid composition comprising a quantity of at least one monoester of Formula I, wherein the monoester of Formula I is secondary monoester.

In some embodiments, the present invention is directed to a drilling fluid composition comprising a quantity of at least one monoester of Formula I, wherein the —O(CO)$R_3$ group of Formula I is not bound to the terminus of $R_1$ or $R_2$.

In some embodiments, the present invention is directed to a drilling fluid composition comprising a quantity of at least one monoester of Formula I, wherein the monoester of Formula I does not comprise products derived from oligomerization.

In some embodiments, the present invention is directed to a drilling fluid composition comprising a quantity of at least one monoester of Formula I, wherein the monoester of Formula I does not comprise products derived from alpha olefins.

I. Monoester-Based Drilling Fluid Compositions

The monoester-based drilling fluids of the present invention may comprise one or more of the following:

A quantity of at least one monoester of Formula I:

wherein $R_1$ and $R_2$ and are independently selected from $C_1$ to $C_{40}$ and $R_3$ is $C_5$ to $C_{40}$.

Surfactants (e.g., emulsifiers, wetting agents), viscosifiers, weighting agents, fluid loss control agents, and shale inhibiting salts are also optionally used in the drilling fluid of the present invention. Because the drilling fluids of the present invention are intended to be non-toxic, these optional ingredients, like the monoester, are preferably also non-toxic. Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidaxolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary weighting agents include, but are not limited to barite, iron oxide, gelana, siderite, and calcium carbonate.

Common shale inhibiting salts are alkali metal and alkaline-earth metal salts. Calcium chloride and sodium chloride are the preferred shale inhibiting salts.

Exemplary viscosifiers include, but are not limited to, organophilic clays (e.g., hectorite, bentonite, and attapulgite), non-organophilic clays (e.g., montmorillonite (bentonite), hectorite, saponite, attapulgite, and illite), oil soluble polymers, polyamide resins, and polycarboxylic acids and soaps.

Examples of fluid loss control agents include, but are not limited to, asphaltics (e.g., asphaltenes and sulfonated asphaltenes), amine treated lignite, and gilsonite. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention.

Optionally, one or more pour point depressants are employed in the synthetic fluids (i.e., monoester-based drilling fluids) of the present invention to lower their pour point. Typical pour point depressants include, but are not limited to, ethylene copolymers, isobutylane polymers, polyaklylnaphthalenes, wax-aromatic condensation products (e.g., wax-naphthalene condensation products, phenol-wax condensation products), polyalkylphenolesters, polyalkylmethacrylates, polymethacrylates, polyalkylated condensed aromatics, alkylaromatic polymers, iminodiimides, and polyalkylstyrene. (The molecular weights for polyaklylnaphthalenes, polyalkylphenolesters, and polyalkylmethacrylates range from about 2,000 to about 10,000) Because they are non-toxic, ethylene copolymers and isobutylene polymers are the preferred pour point depressants.

Up to about 1 weight percent pour point depressant is employed. (As used in the specification and claims, the weight percent of the pour point depressant is based upon the weight of the monoester, i.e., it is the weight of the pour point depressant divided by the weight of the monoester, the quotient being multiplied by 100%) Preferably, the pour point depressant is employed in a concentration of 0.005 to about 0.5, more preferably about 0.01 to about 0.4, and most preferably about 0.02 to about 0.3, weight percent. When employed, the pour point depressant is preferably mixed with the monoester and the resulting composition is then combined with any additional additives as described herein.

The properties (e.g., monoester to water ratio, density, etc.) of the drilling fluids of the invention can be adjusted to suit any drilling operation. For example, the drilling fluid is usually formulated to have a volumetric ratio of monoester to water of about 100:0 to about 40:60 and a density of about 0.9 kg/1 (7.5 pounds per gallon (ppg)) to about 2.4 kg/1 (20 ppg). More commonly, the density of the drilling fluid is about 1.1 kg/1 (9 ppg) to about 2.3 kg/1 (19 ppg).

The drilling fluids are preferably prepared by mixing the constituent ingredients in the following order: (a) monoester, (b) emulsifier, (c) lime (when employed), (d) fluid loss control agent (when employed), (e) an aqueous solution comprising water and the shale inhibiting salt, (f) organophilic clay, (g) oil wetting agent, (h) weighting agent, (i) non-sulfonated polymer (when employed), (j) sulfonated polymer (when employed), and (k) non-organophilic clay (when employed).

II. Methods of Making Monoesters

As mentioned above, the present invention is additionally directed to methods of making the above-described lubricant compositions.

The olefins disclosed here may be alpha olefins produced by gas to liquid processes (GTL) refining processes, petrochemical processes, pyrolysis of waste plastics and other processes, are isomerized into internal olefins followed by conversion into monoesters. The alpha olefins are isomerized into internal olefins using double bond isomerization catalyst including molecular sieves such as SAPO-39 and medium pore zeolites such as SSZ-32 and ZSM-23.

Figure 1:
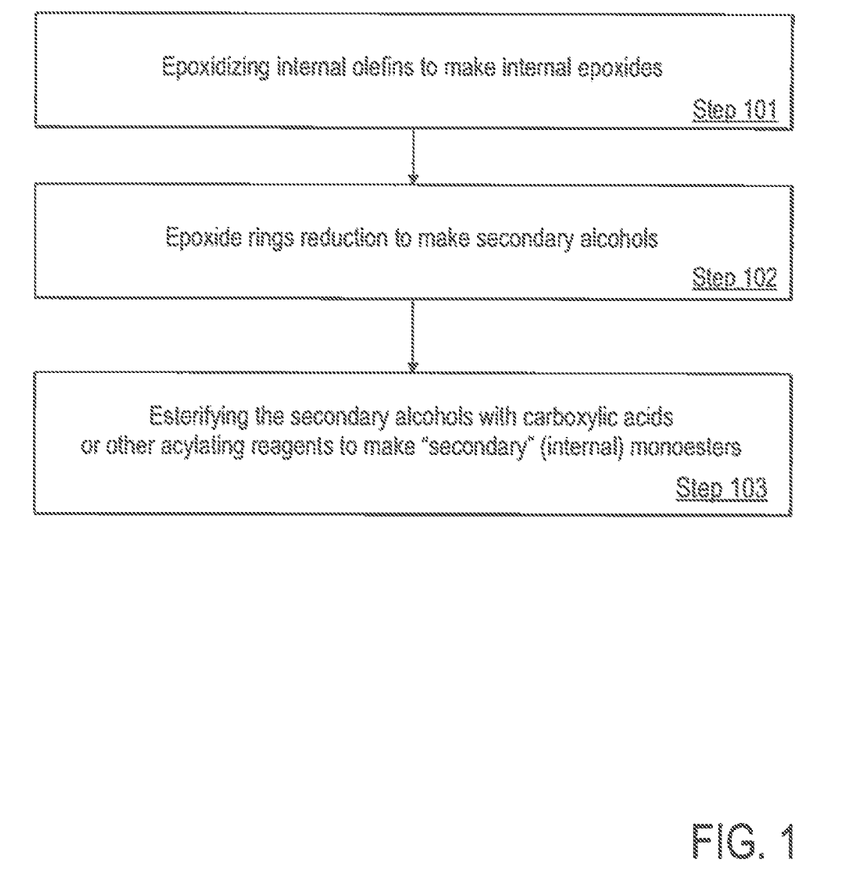
FIG. 1 is a flow diagram illustrating a method of making monoesters for incorporation in monoester-based drilling fluid compositions.
Figure 2A:
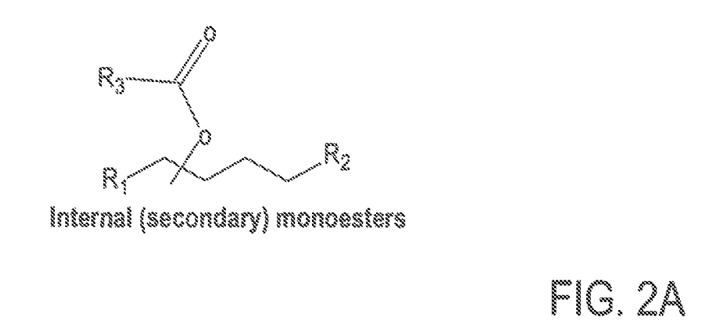
Figure 2B:
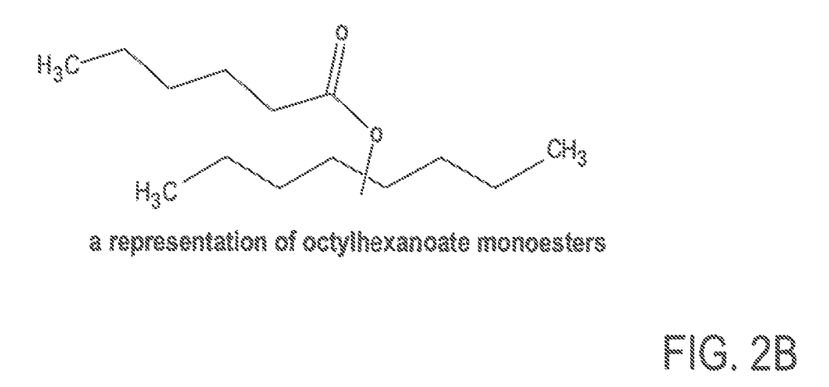
Figure 2C:
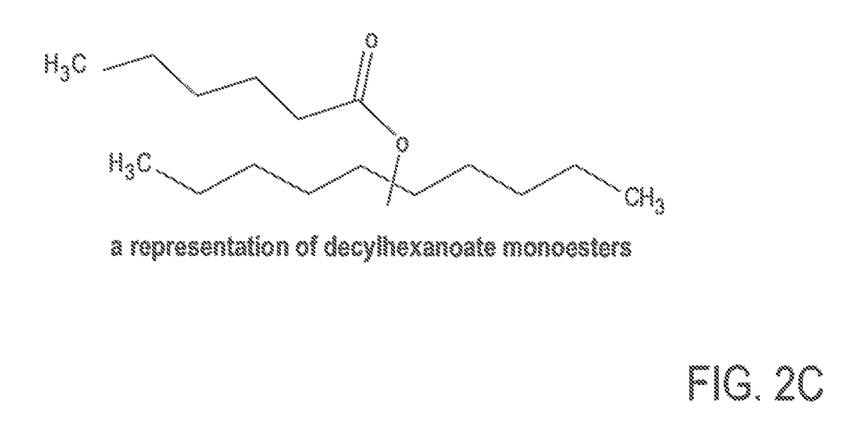

Referring to the flow diagram shown in FIG. 1, in some embodiments, processes for making the above-mentioned monoester species, typically having lubricating base oil viscosity and pour point, comprise the following steps: (Step 101) epoxidizing an internal olefin (or quantity of olefins) having a carbon number of from $C_6$-$C_{84}$ to form an epoxide or a mixture of epoxides; (Step 102) opening the epoxide rings via reduction methods to form the corresponding mono secondary alcohol; and (Step 103) esterifying (i.e., subjecting to esterification) the secondary alcohol with a $C_6$-$C_{41}$ carboxylic acid to form internal monoester species. Generally, lubricant compositions comprising such monoester species have a viscosity in the range from 0.5 centistokes to 2 centistokes at a temperature of 100° C.

In some embodiments, where a quantity of such monoester species is formed, the quantity of monoester species can be substantially homogeneous, or it can be a mixture of two or more different such monoester species.

In some such above-described method embodiments, the olefin used is a reaction product of a Fischer-Tropsch process. In these or other embodiments, the carboxylic acid can be derived from alcohols generated by a Fischer-Tropsch process and/or it can be a bio-derived fatty acid.

In some embodiments, the olefin is an α-olefin (i.e., an olefin having a double bond at a chain terminus). In such embodiments, it is usually necessary to isomerize the olefin so as to internalize the double bond. Such isomerization is typically carried out catalytically using a catalyst such as, but not limited to, crystalline aluminosilicate and like materials and aluminophosphates. (see, e.g., U.S. Pat. Nos. 2,537,283; 3,211,801; 3,270,085; 3,327,014; 3,304,343; 3,448,164; 4,593,146; 3,723,564 and 6,281,404); the last of which claims a crystalline aluminophosphate-based catalyst with 1-dimensional pores of size between 3.8 Å and 5 Å.

As an example of such above-described isomerizing and as indicated in Scheme 1 (FIG. 3), Fischer-Tropsch alpha olefins (α-olefins) can be isomerized to the corresponding internal olefins followed by epoxidation. The epoxides can then be transformed to the corresponding secondary mono alcohols via epoxide ring reduction followed by esterifying (i.e., di-esterification) with the appropriate carboxylic acids or their acylating derivatives. It is typically necessary to convert alpha olefins to internal olefins because monoesters of alpha olefins, especially short chain alpha olefins, tend to be solids or waxes. "Internalizing" alpha olefins followed by transformation to the monoester functionalities introduces branching along the chain in the produced esters and thus reduces the symmetry of the molecules which in turn reduces the pour point of the intended products. Internalizing the ester may also enhance the oxidative and hydrolytic stability. Internal esters show surprising hydrolytic and oxidative stabilities that are much superior to those of terminal esters. Internalizing the ester makes it sterically more hindered and that may contribute to the oxidative and hydrolytic stabilities.

The ester groups with their polar character would further enhance the viscosity of the final product. Branching, introduced by internalizing the ester groups, will enhance the cold temperature properties such as pour and cloud points. Viscosity can be increased by increasing the carbon number of the internal olefin or the acid used in the esterification.

Regarding the step of epoxidizing (i.e., the epoxidation step), in some embodiments, the above-described olefin (preferably an internal olefin) can be reacted with a peroxide (e.g., $H_2O_2$) or a peroxy acid (e.g., peroxyacetic acid) to generate an epoxide. (see, e.g., D. Swern, in *Organic Peroxides Vol. II*, Wiley-Interscience, New York, 1971, pp. 355-533; and B. Plesnicar, in Oxidation in *Organic Chemistry, Part C*, W. Trahanovsky (ed.), Academic Press, New York 1978, pp. 221-253). Olefins can be efficiently transformed to the corresponding diols by highly selective reagent such as osmium tetra-oxide (see M. Schroder, Chem. Rev. vol. 80, p. 187, 1980) and potassium permanganate (see Sheldon and Kochi, in Metal-Catalyzed Oxidation of Organic Compounds, pp. 162-171 and 294-296, Academic Press, New York, 1981).

Regarding the step of epoxide ring opening to the corresponding secondary mono alcohols, this step is done by epoxide ring reduction using metal hydrides reduction procedures or noble metal-catalyzed hydrogenations processes. Both procedures are very effective at making the needed secondary alcohols for internal epoxides.

Regarding the step of esterifying (esterification), an acid is typically used to catalyze the esterification reaction of alcohols and carboxylic acids. Suitable acids for esterification include, but are not limited to, sulfuric acid (see Munch-Peterson, Org. Synth., V, p. 762, 1973), sulfonic acid (see Allen and Sprangler, Org Synth., III, p. 203, 1955), hydrochloric acid (see Eliel et al., Org Synth., IV, p. 169, 1963), and phosphoric acid (among others). In some embodiments, the carboxylic acid used in this step is first converted to an acyl chloride (e.g., thionyl chloride or $PCl_3$). Alternatively, an acyl chloride could be employed directly. Wherein an acyl chloride is used, an acid catalyst is not needed and a base such as pyridine, 4-dimethylaminopyridine (DMAP) or triethylamine (TEA) is typically added to react with an HCl produced. When pyridine or DMAP is used, it is believed that these amines also act as a catalyst by forming a more reactive acylating intermediate. (see, e.g., Fersh et al., J. Am. Chem. Soc., vol. 92, pp. 5432-5442, 1970; and Hofle et al., Angew. Chem. Int. Ed. Engl., vol. 17, p. 569, 1978).

Regardless of the source of the olefin, in some embodiments, the carboxylic acid used in the above-described method is derived from biomass. In some such embodiments, this involves the extraction of some oil (e.g., triglyceride) component from the biomass and hydrolysis of the triglycerides of which the oil component is comprised so as to form free carboxylic acids.

Using a synthetic strategy in accordance with that outlined in Scheme 1, Scheme 2, and Scheme 3, a mixture of internal octenes was converted to the corresponding mixture of internal monoester derivatives, octyl hexanoates and octyl decanoates via acylation of the octyl alcohols intermediates with hexanoyl and decanoyl chlorides, respectively. The Examples below explain this process in more detail. Octyl and decyl hexanoates are particularly suitable for use in drilling fluid compositions.

DEFINITIONS AND TERMS

The following terms will be used throughout the specification and will have the following meanings unless otherwise indicated.

The term "Drilling Fluid," refers to any of a number of liquid and gaseous fluids and mixtures of fluids and solids (as solid suspensions, mixtures and emulsions of liquids, gases and solids) used in operations to drill boreholes into the earth. Synonymous with "drilling mud" in general usage, although some prefer to reserve the term "drilling fluid" for more sophisticated and well-defined "muds."

The term "Rheology", refers to the study of deformation and flow of matter. Rheological measurements of a drilling fluid include plastic viscosity (PV), yield point (YP) and gel strengths. The information from these measurements can be used to determine hole cleaning efficiency, system pressure losses, equivalent circulating density, surge and swab pressures and bit hydraulics.

The term "Fluid Loss Control Agent" includes, but are not limited to, asphaltics (e.g., asphaltenes and sulfonated asphaltenes), amine treated lignite, and gilsonite. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the drilling fluid of this invention.

The term "Organophilic Clay" or "Viscosifiers", refers to CARBO-GEL® II (Baker-Hughes), organophilic bentonite, hectorite, attapulgite and sepiolite. Bentonite and hectorite are platelet clays that will increase viscosity, yield point and build a thin filter cake to aid in reducing the fluid loss. A number of polymers are available for use in non-aqueous fluids. These polymers increase fluid carrying capacity and may also function as fluid loss control additives. They include: elastomeric viscosifiers, sulfonated polystyrene polymers, styrene acrylate, fatty acids and dimer-trimer acid combinations.

The term "Emulsifiers and Wetting Agents", refers to primary emulsifiers which are generally very powerful, fatty acid based surfactants. They usually require lime to activate and build a stable emulsion. Secondary emulsifiers, often called wetting agents, are typically based on imidazolines or amides (e.g., OMNI-MUL®, Baker-Hughes), and do not require lime to activate. They are designed to oil-wet solids and also emulsify oil. To formulate stable water in oil mixtures, the use of surfactants is required. Surfactants lower surface tension and emulsify the internal water phase and "oil wet" solids. In practice, emulsifiers are classified as either "primary" or "secondary", depending on the desired application.

The term "Salt," refers to $CaCl_2$ used to make drilling fluids or brines with a suitable density. $CaCl_2$ can be blended with other brines, including NaCl, $CaBr_2$ and $ZnBr_2$. Emulsification of $CaCl_2$ brine as the internal phase of synthetic-based mud is an important use because the brine provides osmotic wellbore stability while drilling water-sensitive shale zones.

The term "Weighting Agents", refers to barite (barium sulfate) (e.g. MICROMAX™) as used to increase the density of drilling fluids. Other weighting agents are hematite (iron oxide), manganese tetraoxide and calcium carbonate. These weighting materials increase the density of the external phase of the fluids.

The term "Latex Filtration Control Agent", refers to Pliolite® (Goodyear) polymers.

The term "Simulated Drill Solids", refers to powdered clay as used to simulate drilled formation particles.

The term "non-Organophilic Clay," refers to a clay which has not been amine-treated to convert the clay from water-yielding to oil-yielding.

The term "Mud Weight" or "Density", refers to a mud fluid property for balancing and controlling downhole formation pressures and promoting wellbore stability. Mud densities are usually reported in pounds per gallon (lb/gal). As most drilling fluids contain at least a little air/gas, the most accurate way to measure the density is with a pressurized mud balance.

The term "Lime," refers to quicklime (CaO), quicklime precursors, and hydrated quicklime (e.g., slaked lime (Ca$(OH)_2$).

The term "Surfactant," refers to substances that when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases and the term "surface" denotes an interface where one phase is a gas, usually air.

The term "Lubricant," refers to substances (usually a fluid under operating conditions) introduced between two moving surfaces so to reduce the friction and wear between them. Base oils used as motor oils are generally classified by the American Petroleum Institute as being mineral oils (Group I, II, and III) or synthetic oils (Group IV and V). See American Petroleum Institute (API) Publication Number 1509.

The term "Pour point," refers to the lowest temperature at which a fluid will pour or flow. (see, e.g., ASTM International Standard Test Methods D 5950-96, D 6892-03, and D 97). The results are reported in degrees Celsius. Many commercial base oils have specifications for pour point. When base oils have low pour points, the base oils are also likely to have other good low temperature properties, such as low cloud point, low cold filter plugging point, and low temperature cranking viscosity.

The term "Cloud Point," refers to the temperature at which a fluid begins to phase separate due to crystal formation. See, e.g., ASTM Standard Test Methods D 5773-95, D 2500, D 5551, and D 5771.

The term "Centistoke," abbreviated "cSt," is a unit for kinematic viscosity of a fluid (e.g., a lubricant), wherein 1 centistoke equals 1 millimeter squared per second (1 cSt=1 $mm^2/s$). See, e.g., ASTM Standard Guide and Test Methods D 2270-04, D 445-06, D 6074, and D 2983.

With respect to describing molecules and/or molecular fragments herein, "$R_n$," where "n" is an index, refers to a hydrocarbon group, wherein the molecules and/or molecular fragments can be linear and/or branched.

The term "$C_n$," where "n" is an integer, describes a hydrocarbon molecule or fragment (e.g., an alkyl group) wherein "n" denotes the number of carbon atoms in the fragment or molecule.

The prefix "Bio," refers to an association with a renewable resource of biological origin, such as resource generally being exclusive of fossil fuels.

The term "Internal Olefin," refers to an olefin (i.e., an alkene) having a non-terminal carbon-carbon double bond (C═C). This is in contrast to "α-olefins" which do bear a terminal carbon-carbon double bond.

The term "Group I Base Oil," refers to a base oil which contains less than 90 percent saturates and/or greater than 0.03 percent sulfur and have a viscosity index greater than or equal to 80 and less than 120 using the ASTM methods specified in Table E-1 of American Petroleum Institute Publication 1509.

The term "Group II Base Oil," refers to a base oil which contains greater than or equal to 90% saturates and less than or equal to 0.03% sulfur and has a viscosity index greater than or equal to 80 and less than 120 using the ASTM methods specified in Table E-1 of American Petroleum Institute Publication 1509.

The term "Group II+ Base Oil," refers to a Group II base oil having a viscosity index greater than or equal to 110 and less than 120.

The term "Group III Base Oil," refers to a base oil which contains greater than or equal to 90% saturates and less than or equal to 0.03% sulfur and has a viscosity index greater than or equal to 120 using the ASTM methods specified in Table E-1 of American Petroleum Institute Publication 1509.

The term "Fischer-Tropsch Derived," refers to a product, fraction, or feed that originates from or is produced at some stage by a Fischer-Tropsch process.

The term "Petroleum Derived," refers to a product, fraction, or feed originates from the vapor overhead streams from distilling petroleum crude and the residual fuels that are the non-vaporizable remaining portion. A source of the petroleum derived product, fraction, or feed can be from a gas field condensate.

The term "Highly Paraffinic Wax," refers to a wax having a high content of n-paraffins, generally greater than 40 wt %, but can be greater than 50 wt %, or even greater than 75 wt %, and less than 100 wt % or 99 wt %. Examples of highly paraffinic waxes include slack waxes, deoiled slack waxes, refined foots oils, waxy lubricant raffinates, n-paraffin waxes, NAO waxes, waxes produced in chemical plant processes, deoiled petroleum derived waxes, microcrystalline waxes, Fischer-Tropsch waxes, and mixtures thereof.

The phrase "Derived from Highly Paraffinic Wax," refers to a product, fraction, or feed originates from or is produced at some stage by from a highly paraffinic wax.

The term "Aromatics," refers to any hydrocarbonaceous compounds that contain at least one group of atoms that share an uninterrupted cloud of delocalized electrons, where the number of delocalized electrons in the group of atoms corresponds to a solution to the Huckel rule of 4n+2 (e.g., n=1 for 6 electrons, etc.). Representative examples include, but are not limited to, benzene, biphenyl, naphthalene, and the like.

The phrase "Molecules with Cycloparaffinic Functionality," refers to any molecule that is, or contains as one or more substituents, a monocyclic or a fused multicyclic saturated hydrocarbon group. The cycloparaffinic group can be optionally substituted with one or more, such as one to three, substituents. Representative examples include, but are not limited to, cyclopropyl, cyclobutyl, cyclohexyl, cyclopentyl, cycloheptyl, decahydronaphthalene, octahydropentalene, (pentadecan-6-yl)cyclohexane, 3,7,10-tricyclohexylpentadecane, decahydro-1-(pentadecan-6-yl)naphthalene, and the like.

The phrase "Molecules with Monocycloparaffinic Functionality," refers to any molecule that is a monocyclic saturated hydrocarbon group of three to seven ring carbons or any molecule that is substituted with a single monocyclic saturated hydrocarbon group of three to seven ring carbons. The cycloparaffinic group can be optionally substituted with one or more, such as one to three, substituents. Representative examples include, but are not limited to, cyclopropyl, cyclobutyl, cyclohexyl, cyclopentyl, cycloheptyl, (pentadecan-6-yl)cyclohexane, and the like.

The phrase "Molecules with Multicycloparaffinic Functionality," refers to any molecule that is a fused multicyclic saturated hydrocarbon ring group of two or more fused rings, any molecule that is substituted with one or more fused multicyclic saturated hydrocarbon ring groups of two or more fused rings, or any molecule that is substituted with more than one monocyclic saturated hydrocarbon group of three to seven ring carbons. The fused multicyclic saturated hydrocarbon ring group often is of two fused rings. The cycloparaffinic group can be optionally substituted with one or more, such as one to three, substituents. Representative examples include, but are not limited to, decahydronaphthalene, octahydropentalene, 3,7,10-tricyclohexylpentadecane, decahydro-1-(pentadecan-6-yl)naphthalene, and the like.

The term "Kinematic Viscosity," refers to a measurement of the resistance to flow of a fluid under gravity. Many base oils, lubricant compositions made from them, and the correct operation of equipment depends upon the appropriate viscosity of the fluid being used. Kinematic viscosity is determined by ASTM D445-06. The results are reported in $mm^2/s$.

The term "Viscosity Index" (VI), refers to an empirical, unitless number indicating the effect of temperature change on the kinematic viscosity of the oil. Viscosity index is determined by ASTM D2270-04.

The term "Oxidator BN," refers to a measurement of the response of a base oil in a simulated application. High values, or long times to adsorb one liter of oxygen, indicate good stability. Oxidator BN can be measured via a Dornte-type oxygen absorption apparatus (see R. W. Dornte "Oxidation of White Oils," Industrial and Engineering Chemistry, Vol. 28, page 26, 1936), under 1 atmosphere of pure oxygen at 340° F. The time, in hours, to absorb 1000 ml of $O_2$ by 100 grams of oil is reported. In the Oxidator BN test, 0.8 ml of catalyst is used per 100 grams of oil. The catalyst is a mixture of soluble metal-naphthenates simulating the average metal analysis of used crankcase oil. The additive package is 80 millimoles of zinc bispolypropylenephenyldithiophosphate per 100 grams of oil.

Unless otherwise indicated herein, scientific and technical terms used in connection with the present invention shall have the meanings that are commonly understood by those of ordinary skill in the art. Further, unless otherwise required by context, singular terms shall include pluralities and plural terms shall include the singular. More specifically, as used in this specification and the appended claims, the singular forms "a", "an" and "the" include plural referents unless the context clearly dictates otherwise. Thus, for example, reference to "a fatty acid" includes a plurality of fatty acids, and the like. In addition, ranges provided in the specification and appended claims include both end points and all points between the end points. Therefore, a range of 2.0 to 3.0 includes 2.0, 3.0 and all points between 2.0 and 3.0. Furthermore, all numbers expressing quantities, percentages or proportions, and other numerical values used in the specification and claims, are to be understood as being modified in all instances by the term "about". As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

EXAMPLES

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

Epoxidation of Octenes into Epoxy Octanes

A mixture of 2-octene, 3-octene and 4-octene (1:1:1 mixture), purchased from Aldrich Chemical company, were epoxidized as follows using the general procedure described below (Scheme 1). To a stirred solution of 509 grams (2.95 mol) of 77% mCPBA (meta-chloroperoxybenzoic acid) in 2000 mL n-hexane in an ice bath, 265 grams (2.36 mol) of 2-octene, 3-octene and 4-octene (1:1:1) mixture were added drop-wise via an addition funnel over a period of 60 minutes. The resulting reaction mixture was stirred over 0° C. for 2 hrs. Then, the ice bath was removed and the reaction was allowed to stir overnight. The resulting milky solution was subsequently filtered to remove meta-chloro-benzoic acid that formed therein. The filtrate was then washed with a 10% aqueous solution of sodium bicarbonate. The organic layer was dried over anhydrous magnesium sulfate while stirring for 1 hr. The organic solvent (n-hexane) was removed by distillation at atmospheric pressure and 67-71° C. IR and NMR analysis and GCMS spectroscopy on the remaining solution confirmed the presence of the epoxide mixture with little residual n-hexane. This solution was used as is for next step (reduction of the epoxides to the corresponding secondary alcohols) without any further attempt to remove the remaining hexane. The epoxide is a little volatile and care must be taken to prevent any appreciable loss by distillation or condensation on a rotary evaporator. Epoxidation was also accomplished using formic acid/hydrogen epoxide solution of 1:1.5 parts.

Scheme 1

Octenes

[EXPOXIDATION]
mCPBA

Epoxy Octanes

Example 2

Reduction of 2,3-Epoxy Octanes to Secondary Octanols

The epoxy octanes with little residual hexane produced according to example 1 were reduced with lithium aluminum hydride in THF (Tetrahydrofuran) according to the procedure described below. The products from example 1 were divided into two equal portions and each portion was reduced separately with lithium aluminum hydride in anhydrous THF. Assuming full conversion of the octenes to epoxides in example 1, each portion was assumed to contain 1.18 moles (151.3 grams) of epoxy octanes. Accordingly, a suspension of 56 grams (1.48 mol.) of lithium aluminum hydride in 1000 mL anhydrous THF in 3-liter 3-neck reaction flask equipped with an overhead stirrer and reflux condenser, was cooled down to 0° C. in an ice-bath. To this suspension and while stirring, one of the two portions of the epoxy octanes mixture (presuming 151.3 grams; 1.18 mol.) was added drop-wise via a sealed dropping funnel Once the addition was complete, an additional 100 ml of THF was added via the dropping funnel to. The reaction mixture was left to stir at 0° C. for 2 hrs. The ice-bath was then removed and the reaction left to stir overnight. The reaction was then heated to reflux for an hour or so to ensure reduction completion. The reaction progress was monitored by NMR and IR analysis on small aliquots work-up. Once completed, the heat source was replaced with an ice-bath and the reaction was worked up by first diluting with 500 ml THF and then adding 550 ml of 15% NaOH solution via a dropping funnel with vigorous stirring and not allowing the temperature of the reaction to rise above room temperature (very slow addition). The addition continued until all the grey solution transformed into a milky solution which was left to stir for addition 30 minutes. The stirring was stopped and the solution nicely separated into a clear liquid phase and a fine white precipitate. The mixture was filtered and the filtrate was dried over anhydrous MgSO4 and then concentrated on a rotary evaporator to remove the solvent THF and afford a mixture of 2-octanol, 3-octanol, and 4-octanol as colorless viscous oil that turned into a very soft waxy substance while standing at room temperature for few days. The reduction afforded 132 grams of the alcohols or 86% yield for the two reactions described in examples 1 and 2. Reduction of the second portion of the epoxy octanes gave similar results with 84% overall yield. Reduction was also accomplished by mild hydrogenation over Pd/C catalyst on small scale.

Scheme 2

Expoxy Octanes

[REDUCTION]
LiAlH$_4$

Octanols

Example 3

Esterification of Octanols with Hexanoyl Chloride

Synthesis of Octyl Hexanoates

The mixture of 2-octanol, 3-octanol, and 4-octanol prepared in example 2 was esterified according to the procedure below using hexanoyl chloride as the esterification agent as shown in Scheme 3. To a solution of 130.5 grams (1 mol.) of the octanols mixture in 1000 ml cyclohexane in a 3-neck 3 L round bottom reaction vessel equipped with an overhead stirrer and reflux condenser, 126.5 grams (1.25 mol.) of triethylamine and 6.5 grams (0.05 mol.) of 4-N,N-dimethylaminopyridine (DMAP). The mixture was cooled down by means of an ice-bath and left to stir at around 0° C. for 15 minutes. To the stirring cold solution, 148 grams (1.1 mol.) of hexanoyl chloride was added drop-wise via a dropping funnel over 45 minutes. Once all hexanoyl chloride was added the reaction was left to stir and warm slowly to room temperature. The reaction, then, was refluxed and monitored by NMR and IR analysis. Once the reaction was completed, the resulting milky creamy solution was worked up by adding water until all the solids disappeared and a clear solution formed (two phase solution). The two phase solution was separated in a separatory funnel and the organic phase was washed with water and brine and saved. The aqueous phase was extracted with ethyl acetate. The ethyl acetate extract was washed with brine and was combined to the organic phase. The organic phase, containing the esters, was dried over anhydrous MgSO4, filtered and concentrated on a rotary evaporator to give 218 grams (96% yields) of the esters mixture as slightly orange-colored oil. The product was passed through 15 cm×5 cm silica gel plug and flushed with hexane. The hexane was removed on a rotary evaporator to give the product as colorless oil (214 gm were recovered).

cm silica gel plug to remove any residual acids. After the final purification step, 73 grams of the desired esters (octyl hexanoates) was recovered as colorless oil with a sweet odor. Using identical synthesis procedures, decyl hexanoates were synthesized in similar yields.

Example 5

Lubrication Properties of Octyl Hexanoates and Decyl Hexanoates

The table below shows the lubrication properties of octyl hexanoates and decyl hexanoates.

Scheme 3

Example 4

Esterification with Hexanoic Acid Using $H_3PO_4$ as Catalyst

The mixture of octanols was also esterified with hexanoic acid in toluene and using phosphoric acid as catalyst according to the procedure shown below. The reaction apparatus consisted of a 3-neck 1 L reaction flask equipped with an overhead stirrer, reflux condenser with a Dean-Stark trap and a heating mantle. The reaction vessel was charged with 50 gm (0.38 mol.) of octanols mixture, 66 gm (0.57 mol.) hexanoic acid, 5 gm of 85% phosphoric acid, and 250 ml toluene. The mixture was heated at reflux (~110° C.) for 6 hrs and left to stir at reflux overnight. One more gram of 85% $H_3PO_4$ was added and the reaction was left to continue stirring at reflux until no more water formation was observed (as indicated by the level of water collected in the Dean-Stark trap). In all, the reaction stirred for approximately 36 hrs. The reaction was then cooled down and worked up by removing the toluene on a rotary evaporator followed by extraction in diethyl ether and extensive washing with warm water (4×500 ml) followed by rinsing with 300 ml of saturated sodium bicarbonate solution to remove any residual acids (organic and inorganic) and with brine solution (300 ml). The ether extract was dried over anhydrous MgSO4, filtered and concentrated on a rotary evaporated to remove ether. The reaction afforded 76 gram of faint yellow oil. The oil was then passed through a 10 cm×4

TABLE 1

| Esters | Viscosity @100° C. | Viscosity @40° C. | Viscosity @0° C. | Pour Point ° C. | BN Oxidator |
|---|---|---|---|---|---|
| Octyl Hexanoates | 0.9 cSt. | 2.2 cSt. | 5.8 cSt. | <−60 | 64 hrs |
| Decyl Hexanoates | 1.2 cSt. | 3.1 cSt. | 10.8 cSt. | <−60 | N/A |

N/A is defined as "not available".

Example 6

Oxidator BN Test

The octyl hexanoate mixture was evaluated for oxidation stability by measuring how much time it takes for a given amount of the ester to absorb 1 liter of Oxygen using the Oxidator BN test. Octyl hexanoates exhibited superior oxidation stability with 64 hrs (see Table 1 above).

Example 7

Preparation of a Drilling Fluid from Example 4

An invert emulsion drilling fluid was prepared by (a) initially agitating 166.0 grams of the ester from Example 4 (Octyl Hexanoates) for about one minute using a blender and (b) then sequentially adding the following ingredients (with continuous mixing for about one minute after the addition of each material): (i) 16.0 grams of an emulsifier and wetting agent (OMNI-MUL®, Baker-Hughes); and (ii) 3.0 grams of an organophilic clay (CARBO-GEL® II, Baker-Hughes). Subsequently, 46.0 grams of water was added to the above mixture and mixed for about 10 minutes. Next, the following materials were added in sequence, with about 5 minutes of mixing after the addition of each of the materials: (i) 300.3 grams of powdered barite (a non-toxic weighting agent); (ii) 17.2 grams of calcium chloride dehydrate (to provide salinity to the water phase without water wetting the barite); (iii) 4.0 grams of a latex filtration control agent (Pliolite®, Goodyear); and (iv) 40.0 grams of a powdered clay to simulate drilled formation particles. The final density of the drilling fluid was 14 pounds per gallon (about 1.7 kg/1).

Example 8

Preparation of a Drilling Fluid from Example 4

An invert emulsion drilling fluid was prepared by (a) initially agitating 168.076 grams of the ester from Example 4 (Octyl Hexanoates) for about one minute using a blender and (b) then sequentially adding the following ingredients (with continuous mixing for about one minute after the addition of each material): (i) 12.0 grams of an emulsifier and wetting agent (OMNI-MUL®, Baker-Hughes); and (ii) 2.5 grams of an organophilic clay (CARBO-GEL® II, Baker-Hughes). Subsequently, 48.3 grams of water was added to the above mixture and mixed for about 10 minutes. Next, the following materials were added in sequence, with about 5 minutes of mixing after the addition of each of the materials: (i) 300.3 grams of powdered barite (a non-toxic weighting agent); (ii) 17.2 grams of calcium chloride dehydrate (to provide salinity to the water phase without water wetting the barite); (iii) 2.0 grams of a latex filtration control agent (Pliolite®, Goodyear); and (iv) 40.0 grams of a powdered clay to simulate drilled formation particles. The final density of the drilling fluid was 14 pounds per gallon (about 1.7 kg/1).

Example 9

Rheology of a Drilling Fluid from Example 7

The rheology of the drilling fluid of Example 7 was evaluated in a Fann iX77 instrument (Fann Instrument Company, Houston, Tex.), according to procedures described in *Recommended Practice-Standard Procedure for Field Testing Drilling Fluids*, API Recommended Practice 13B-2 (RP 13B-2), Second Edition, Dec. 1, 1991, American Petroleum Institute, Washington, D.C. The measured results are given in Table 2A. These results show that the ester of Example 4 can be used to make an acceptable drilling fluid, and has exceptionally low gel strength at high temperature (200° F. and higher).

TABLE 2A

| | FANN 35 | FANN 77 | | | | | |
| --- | --- | --- | --- | --- | --- | --- | --- |
| | | Test Temperature, ° F. | | | | | |
| | 120 | 80 | 150 | 200 | 250 | 300 | 80 |
| | | | Test Pressure, psig | | | | |
| Dial Readings @: | 0 | 0 | 5000 | 10000 | 15000 | 20000 | 0 |
| 600 RPM | 97 | 139 | 98 | 89 | 79 | 83 | 128 |
| 300 RPM | 56 | 81 | 55 | 48 | 43 | 47 | 73 |
| 200 RPM | 42 | 59 | 41 | 36 | 32 | 34 | 54 |
| 100 RPM | 26 | 37 | 24 | 21 | 18 | 19 | 33 |
| 60 RPM | N/A | 27 | 18 | 14 | 12 | 14 | 24 |
| 30 RPM | N/A | 18 | 11 | 9 | 8 | 9 | 16 |
| 20 RPM | N/A | 15 | 9 | 7 | 6 | 7 | 13 |
| 10 RPM | N/A | 11 | 6 | 5 | 5 | 6 | 9 |
| 6 RPM | 6 | 9 | 5 | 4 | 4 | 5 | 8 |
| 3 RPM | 5 | 7 | 4 | 3 | 3 | 4 | 6 |
| Plastic Viscosity, cSt | 41 | 59 | 43 | 41 | 36 | 36 | 55 |
| Yield Point, lb/100 sq ft | 15 | 22 | 11 | 8 | 7 | 10 | 19 |
| 10 Second Gel, lb/100 sq ft | 7 | 6 | 3 | 2 | 1 | 2 | 5 |
| 10 Minute Gel, lb/100 sq ft | 9 | 7 | 4 | 2 | 1 | 7 | 6 |
| | Before Gels spin for 30 Seconds @ 600 RPM | | | | | | |
| 10 Seconds @ 600 RPM | N/A | 139 | 98 | 85 | 79 | 86 | 127 |
| 10 Seconds @ 300 RPM | N/A | 79 | 56 | 48 | 43 | 49 | 73 |
| 10 Seconds @ 600 RPM | N/A | 135 | 96 | 85 | 79 | 87 | 126 |
| End @ 600 RPM | N/A | 136 | 96 | 88 | 82 | 91 | 126 |

N/A is defined as "not available".

Example 10

Rheology of a Drilling Fluid from Example 8

The rheology of the drilling fluid of Example 8 was evaluated in a Fann iX77 instrument (Fann Instrument Company, Houston, Tex.), according to procedures described in *Recommended Practice-Standard Procedure for Field Testing Drilling Fluids*, API Recommended Practice 13B-2 (RP 13B-2), Second Edition, Dec. 1, 1991, American Petroleum Institute, Washington, D.C. The measured results are given in Table 2B. These results show that the ester of Example 4 can be used to make an acceptable drilling fluid, and has exceptionally low gel strength at high temperature (200° F. and higher).

TABLE 2B

| | FANN 35 | | FANN 77 | | | | |
|---|---|---|---|---|---|---|---|
| | Test Temperature, °F. | | | | | | |
| | 120 | 80 | 50 | 67 | 104 | 190 | 80 |
| | | | Test Pressure, psig | | | | |
| Dial Readings @: | 0 | 0 | 6000 | 11000 | 16000 | 24000 | 0 |
| 600 RPM | 73 | 104 | 235 | 246 | 192 | 109 | 107 |
| 300 RPM | 42 | 63 | 140 | 142 | 110 | 63 | 65 |
| 200 RPM | 32 | 48 | 102 | 106 | 81 | 45 | 50 |
| 100 RPM | 21 | 32 | 64 | 66 | 50 | 26 | 34 |
| 60 RPM | N/A | 24 | 47 | 49 | 36 | 18 | 26 |
| 30 RPM | N/A | 17 | 33 | 33 | 23 | 11 | 18 |
| 20 RPM | N/A | 15 | 27 | 27 | 19 | 9 | 16 |
| 10 RPM | N/A | 11 | 22 | 21 | 14 | 7 | 12 |
| 6 RPM | 7 | 9 | 18 | 18 | 11 | 6 | 10 |
| 3 RPM | 6 | 8 | 15 | 14 | 9 | 5 | 8 |
| Plastic Viscosity, cSt | 31 | 42 | 95 | 104 | 81 | 46 | 42 |
| Yield Point, lb/100 sq ft | 11 | 21 | 45 | 39 | 29 | 17 | 22 |
| 10 Second Gel, lb/100 sq ft | 7 | 8 | 14 | 12 | 7 | 3 | 7 |
| 10 Minute Gel, lb/100 sq ft | 10 | 9 | 16 | 15 | 9 | 4 | 8 |
| Before Gels spin for 30 Seconds @ 600 RPM | | | | | | | |
| 10 Seconds @ 600 RPM | N/A | 104 | 247 | 244 | 191 | 116 | 103 |
| 10 Seconds @ 300 RPM | N/A | 62 | 141 | 138 | 109 | 66 | 62 |
| 10 Seconds @ 600 RPM | N/A | 102 | 231 | 237 | 186 | 118 | 101 |
| End @ 600 RPM | N/A | 103 | 232 | 275 | 192 | 127 | 101 |

N/A is defined as "not available".

The monoester produced a rheological property profile in the Fann 77 test that is unique and different. The difference (and uniqueness) lies in the low gel strengths at 200° F. and 250° F. and high pressure. The formulation showed no indication of settling in the instrument. In addition, the gel strengths are very flat and non-progressive. The benefit itself would be the reduced pump pressure required to initiate circulation after a prolonged drilling cessation.

All patents, patent applications and publications are herein incorporated by reference to the same extent as if each individual patent, patent application or publication was specifically and individually indicated to be incorporated by reference.

The present invention if not to be limited in scope by the specific embodiments described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the appended claims.

What is claimed is:

1. A method for drilling a borehole in a subterranean formation comprising the steps of:
   a. rotating a drill bit at the bottom of the borehole; and
   b. introducing a drilling fluid into the borehole to pick up drill cuttings and to carry at least a portion of the drill cuttings out of the borehole, wherein the drilling fluid comprises:
      i. at least one additive selected from the group consisting of emulsifiers, wetting agents, viscosifiers, weighting agents, and fluid loss control agents; and
      ii. a quantity of monoester isomers, the monoester isomers being secondary monoesters and independently having a Formula I:

wherein $R_1$ and $R_2$ and are independently selected from $C_1$ to $C_8$ alkyl and $R_3$ is $C_5$ to $C_{13}$ alkyl wherein the monoester isomers of Formula I have an Oxidator BN of greater than 30 hours.

2. The method of claim 1, wherein said steps are performed continually.

3. The method of claim 1, wherein the monoester isomers of Formula I are biodegradable and non-toxic.

4. The method of claim 1, wherein the monoester isomers of Formula I are derived from an isomerized olefin.

5. The method of claim 1, wherein $R_1$ and $R_2$ are independently selected from $C_1$ to $C_5$ alkyl and $R_3$ is $C_5$ to $C_8$ alkyl.

6. The method of claim 1, wherein $R_1$ and $R_2$ are independently selected from $C_1$ to $C_3$ alkyl and $R_3$ is $C_5$ to $C_6$ alkyl.

7. The method of claim 1, wherein the kinematic viscosity of the monoester isomers of Formula I at a temperature of 100° C. is between about 0.5 cSt and 2 cSt, at a temperature of 40° C. is between about 2 cSt and 4 cSt, and at a temperature of 0° C. is between about 4 cSt and 12 cSt.

8. The method of claim 1, wherein the monoester isomers of Formula I have a pour point less than about −30° C. and a cloud point less than about −30° C.

9. The method of claim 1, wherein the drilling fluid has a pour point less than about 10° C. and a viscosity at 40° C. between about 1 cSt and about 10 cSt.

10. The method of claim 1, wherein the drilling fluid has a 10 second gel strength between about 2 lb/100 sq ft and about 15 lb/100 sq ft.

11. The method of claim 1, wherein the drilling fluid has a 10 minute gel strength between about 1 lb/100 sq ft and about 17 lb/100 sq ft.

12. The method of claim 5, wherein $R_3$ is $C_5$ alkyl.

13. The method of claim 5, wherein $R_3$ is $C_5$ alkyl and $R_1$ and $R_2$ are $C_2$ alkyl.

14. The method of claim 5, wherein $R_3$ is $C_5$ alkyl and $R_1$ and $R_2$ are $C_3$ alkyl.

15. The method of claim 1, wherein the drilling fluid of Step (b) comprises between about 20 wt % to 40 wt % of the monoester isomers of Formula I.

16. The method of claim 1, wherein the monoester isomers are isomers of a mixture of monoesters of Formula I.

17. The method of claim 1, wherein the monoester isomers are isomers of a single monoester of Formula I.

18. The method of claim 1, wherein the wherein the monoester isomers of Formula I have an Oxidator BN of greater than 60 hours.

* * * * *